Patented Aug. 29, 1933

1,924,170

UNITED STATES PATENT OFFICE 1,924,170

METHOD FOR PREPARING LATEX COMPOSITIONS

Andrew Szegvari, Akron, Ohio, assignor to American Anode, Inc., Akron, Ohio, a Corporation of Delaware No Drawing. Application May 23, 1929
Serial No. 365,564

4 Claims. (Cl. 18—50)

This invention relates to the manufacture of rubber articles directly from latex or similar aqueous dispersions and particularly to the manufacture of such rubber articles which are to be vulcanized in a short time or at a low temperature.

It is well known that rubber articles may be manufactured directly from latex, either natural or artificial, by any one of a variety of methods, such as electrodeposition, coagulation, dessication, filtration, etc., the auxiliary ingredients such as pigments, fillers, softeners, vulcanizing agents, etc. being emulsified or intimately dispersed in water and mixed with the latex. However, most of the modern organic accelerators do not exhibit to the fullest extent their power of accelerating the vulcanization of rubber unless certain inorganic bases are associated therewith. Such bases include the oxides or hydroxides of lead, mercury, manganese, copper, arsenic, magnesium, cadmium, and especially of zinc. These compounds, being all somewhat soluble in water, when mixed with latex liberate the corresponding polyvalent metallic ions which seriously reduce the stability of the latex, or even cause a complete coagulation.

This invention, accordingly, comprises dispersing in water an insoluble soap of a metal which has the property of activating an organic accelerator, mixing the soap dispersion with latex containing a vulcanizing agent and an organic accelerator, separating the solid constituents of the latex, and subjecting them to vulcanization. The above-mentioned insoluble soaps are, however, appreciably soluble in hydrocarbons such as rubber and possess the property of activating organic accelerators to at least the same extent as the metallic oxides, but do not affect the stability of the latex. Indeed, the metal soaps even appear to function as peptizing and dispersing agents under some conditions and therefore actually improve the quality of the latex.

The beneficial effects of the addition of such insoluble soaps are also apparent after coagulation of the latex. Wet coagulated deposits derived from latex containing appreciable quantities of such soaps are considerably tougher and stronger than the deposits obtained from ordinary latex and hence are not as liable to damage by handling before drying. The superior toughness of the deposit also either diminishes or eliminates entirely the danger of cracks forming during the drying of the deposited rubber, even when the composition contains large proportions of solid fillers. The insoluble soaps, being soluble in rubber, will be uniformly distributed throughout the mass of the rubber and will therefore contribute largely to the uniformity and rapidity of the vulcanization. In order to obtain a comparable uniformity of distribution of the solid pigments which are not readily soluble in rubber much larger proportions must be employed, to the detriment of the resilience of the rubber, and of its transparency if it is a so-called "pure gum" composition.

In the practice of this invention the soap which is employed is preferably the compound of zinc, cadmium, or lead with a fatty acid of high molecular weight, such as oleic, stearic, or palmitic acid. Other bivalent metals may be employed, but zinc cadmium, or lead are preferred because of their high activity and the absence of undesirable effects such as the catalytic oxidation effected by copper and manganese compounds. The invention is not limited to the fatty acids mentioned above, since other acids which react similarly, or even amorphous substances with an acid reaction such as rosin, may be substituted therefor. The soap is preferably prepared with a slight excess of the fatty acid so as to insure the complete combination of the metal and to preclude the liberation of coagulating metallic ions in the latex. The excess fatty acid may subsequently be neutralized with ammonia or other non-coagulating base such as sodium or potassium hydroxide, or organic bases.

The soap is dispersed in water prior to its admixture with the latex. A convenient method of dispersing the soap is to swell it with a volatile alkali such as ammonia. For example the soap dispersion may be prepared as follows: 300 parts by weight of oleic acid and 300 parts of stearic acid are melted together in a steam jacketed kettle. 82 parts of zinc oxide are stirred into the hot mixture, agitation being continued until all the zinc oxide has dissolved. 5 parts of concentrated ammonia are added and the mixture is allowed to stand for 2 or 3 hours without cooling, and finally is diluted with a hot dilute ammonia solution to a concentration of about 20%. The soap dispersion sets to a soft pasty gel upon cooling. If desired, organic bases, such as aliphatic amines, may be substituted in whole or in part for the ammonia employed in swelling and dispersing the soap.

A latex composition which is particularly valuable for the preparation of soft rubber articles such as inner tubes for automobile tires, stationers' bands, fountain pen sacs, rubber coatings or linings, etc. contains the quantity of ammonia-preserved natural rubber latex which contains 100 parts by weight of rubber, 15 parts of a 20% dispersion of zinc soap, and 3 parts of sulphur, 0.3 parts of an organic accelerator such as mercaptobenzothiazole, and 1 part of an antioxidant. The sulphur, accelerator, and antioxidant are preferably suspended or dispersed separately in an aqueous alkaline medium and added to the latex in liquid form. The proportions of the various ingredients may be changed somewhat, but those given above have been found very satisfactory. The amount of the insoluble soap employed for each 100 parts of rubber is preferably between 1 part and 5 parts by weight. The mixture is fully as stable as the unmixed latex, in marked contrast to mixtures containing suspended zinc oxide, which are frequently extremely sensitive, thickening or even coagulating spontaneously.

The wet rubber coagulum obtained from mixtures such as that described above, whether by electrodeposition, chemical coagulation, or any other method, is unusually firm and strong. The dry rubber, after vulcanization, say for 20 minutes at a temperature of 275° F., is very strong and tough and highly resilient. Its resistance to deterioration upon aging is remarkably high, this very desirable result probably being due, at least in part, to the unusually uniform vulcanization which is attained. Since the above-mentioned mixture contains no solid pigments which are insoluble in rubber, the product is almost transparent.

Although the hereinabove described composition is preferred for certain purposes, the proportions may be changed or other ingredients may be substituted in whole or in part for those specified. The latex, for example, may be replaced by artificial dispersions of natural or synthetic rubber, or reclaimed rubber, or rubber substitutes. Dispersions of pigments, fillers, softeners, conditioning agents, etc. may be added in order to lend special properties to the finished composition. It is to be understood, that the term latex, as herein employed, is intended to include natural latices of caoutchouc, gutta-percha, balata, etc., as well as artificial latices or aqueous emulsions of caoutchouc, gutta-percha, balata, reclaimed rubber, synthetic rubber, rubber isomers and like products, whether or not admixed with softeners, pigments, fillers, etc., or previously purified, concentrated, or otherwise treated.

While I have herein disclosed with considerable particularity certain preferred manners of performing my invention, I do not thereby desire or intend to limit myself solely thereto, for, as hitherto stated, the procedure may be modified, the precise proportions of the materials utilized may be varied and other materials having equivalent chemical properties may be employed if desired without departing from the spirit and scope of the invention as defined in the appended claims.

I claim:

1. The method of adding metal compounds to latex which comprises reacting a metal oxide or hydroxide with a slight excess of a fatty acid to form a substantially insoluble soap, swelling the soap with a water solution of a strong alkali, and dispersing the soap throughout a body of latex.

2. The method of adding metal compounds to latex which comprises reacting a metal oxide with a slight excess of a fatty acid to form a substantially insoluble soap, swelling the soap with ammonia or a strongly basic organic derivative thereof, and dispersing the soap throughout a body of latex.

3. The method which comprises treating a substantially insoluble metal soap with an ammonium base, dispersing the treated soap in conjunction with sulphur and an organic accelerator throughout a body of latex, removing the water content of the mixture, and vulcanizing the rubber.

4. The method which comprises treating a substantially insoluble soap of zinc, or cadmium, with ammonia, dispersing the treated soap throughout a body of latex in conjunction with sulphur and an organic vulcanization accelerator which is activated by compounds of the said metals, removing the water content of the mixture, and vulcanizing the rubber.

ANDREW SZEGVARI.